United States Patent
Mehn et al.

(10) Patent No.: US 11,167,367 B2
(45) Date of Patent: Nov. 9, 2021

(54) WELDING POWER SUPPLY WITH CONTROLLED AUXILIARY POWER

(75) Inventors: Peter D. Mehn, Oshkosh, WI (US); Bernard J. Vogel, Troy, OH (US)

(73) Assignee: Illinois Tool Works Inc., Glenview, IL (US)

( * ) Notice: Subject to any disclaimer, the term of this patent is extended or adjusted under 35 U.S.C. 154(b) by 346 days.

(21) Appl. No.: 13/426,238

(22) Filed: Mar. 21, 2012

(65) Prior Publication Data

US 2012/0241417 A1   Sep. 27, 2012

Related U.S. Application Data

(60) Provisional application No. 61/467,456, filed on Mar. 25, 2011.

(51) Int. Cl.
| | |
|---|---|
| *B23K 9/095* | (2006.01) |
| *B23K 9/173* | (2006.01) |
| *B23K 9/32* | (2006.01) |
| *B23K 9/10* | (2006.01) |

(52) U.S. Cl.
CPC .......... *B23K 9/0956* (2013.01); *B23K 9/1006* (2013.01); *B23K 9/173* (2013.01); *B23K 9/327* (2013.01)

(58) Field of Classification Search
CPC .. B23K 9/0956; B23K 9/0953; B23K 9/1006; B23K 9/095; B23K 9/1012; B23K 9/1075; B23K 11/24; B23K 11/241; B23K 11/248; B23K 11/25; B23K 11/251; B23K 11/252; B23K 11/253; B23K 11/256; B23K 11/257; B23K 11/258; B23K 11/28

USPC .................................................. 219/108–111
See application file for complete search history.

(56) References Cited

U.S. PATENT DOCUMENTS

| | | | | |
|---|---|---|---|---|
| 5,198,698 A | * | 3/1993 | Paul et al. ....................... | 307/64 |
| 5,957,920 A | * | 9/1999 | Baker ................. | A61B 18/1485 |
| | | | | 606/33 |
| 6,009,877 A | * | 1/2000 | Edwards ............ | A61B 5/04884 |
| | | | | 128/898 |
| 6,023,037 A | * | 2/2000 | Church ................ | B23K 9/1006 |
| | | | | 219/121.39 |
| 6,790,206 B2 | * | 9/2004 | Panescu ............. | A61B 18/1206 |
| | | | | 606/34 |

(Continued)

OTHER PUBLICATIONS

International Search Report & Written Opinion of PCT/US2012/030108 dated Jun. 29, 2012.

*Primary Examiner* — Tu B Hoang
*Assistant Examiner* — Diallo I Duniver
(74) *Attorney, Agent, or Firm* — McAndrews, Held & Malloy, Ltd.

(57) ABSTRACT

A system includes a welding power supply unit and control circuitry. The welding power supply unit includes an auxiliary power supply configured to supply power to an auxiliary power load connected to the auxiliary power supply. The control circuitry is configured to detect a voltage received by the auxiliary power load from the auxiliary power supply, compare an output voltage generated by the auxiliary power supply with the voltage received by the auxiliary power load, and apply a correction factor to the output voltage from the auxiliary power supply based at least in part on the comparison of the output voltage generated by the auxiliary power supply and the voltage received by the auxiliary power load.

18 Claims, 4 Drawing Sheets

(56) References Cited

U.S. PATENT DOCUMENTS

| | | | | |
|---|---|---|---|---|
| 6,897,784 B2* | 5/2005 | Goehlich | ............. | G01M 3/165 |
| | | | | 324/522 |
| 2002/0061727 A1* | 5/2002 | Mangold | ................ | H01B 7/36 |
| | | | | 455/3.05 |
| 2005/0205543 A1* | 9/2005 | Meckler | ................... | 219/137.71 |
| 2006/0086706 A1* | 4/2006 | Ulrich | .......................... | 219/132 |
| 2006/0138113 A1* | 6/2006 | Ott | ............................. | 219/132 |
| 2007/0080154 A1 | 4/2007 | Ott et al. | | |
| 2007/0181547 A1 | 8/2007 | Vogel et al. | | |
| 2009/0173726 A1* | 7/2009 | Davidson et al. | ....... | 219/130.01 |
| 2010/0308026 A1* | 12/2010 | Vogel | .................. | H02M 3/157 |
| | | | | 219/130.21 |
| 2010/0308027 A1 | 12/2010 | Vogel | | |
| 2010/0320183 A1 | 12/2010 | Borchert et al. | | |

* cited by examiner

WELDING POWER SUPPLY WITH CONTROLLED AUXILIARY POWER

CROSS REFERENCE TO RELATED APPLICATIONS

This application is a Non-Provisional Patent Application of U.S. Patent Application No. 61/467,456, entitled "Welding Power Supply with Controlled Auxiliary Power" and filed Mar. 25, 2011, which is herein incorporated by reference in its entirety.

BACKGROUND

The invention relates generally to welding systems and, more particularly, to a welding system configured to support auxiliary devices.

Welding systems often include various welding accessories or other equipment, such as wire feeders, shielding gas sources, and so forth. As such, the welding systems may include a power supply configured to provide power to these accessories, referred to as auxiliary power. Auxiliary power is typically unregulated, and may be delivered at various constant power levels, for example 115 VAC rated at 20 amps or 42 VDC rated at 10 amps. However, the load demand of the accessories may vary depending on the particular arrangement of accessories or the welding operation, and the auxiliary power may not respond to these variations. Thus, the operation of the welding accessory may be inefficient and may result in inrush current, overload current, or other undesirable conditions.

BRIEF DESCRIPTION

In a first embodiment, a system includes a welding power supply unit and control circuitry. The welding power supply has an auxiliary power supply configured to supply power to an auxiliary power load. The control circuitry is configured to determine parameters relating to an interconnection cable connecting the auxiliary power supply and the auxiliary power load.

In a second embodiment, a method includes: generating output power having an output parameter from an auxiliary power supply of a welding unit; detecting a received parameter relating to received power by an auxiliary power load connected to the auxiliary power supply; comparing the output parameter generated by the auxiliary power supply and the received parameter received by the auxiliary power load; and applying a correction factor to the output parameter of the auxiliary power supply based at least in part on the comparison of the output parameter and the received parameter.

In a third embodiment, a system includes a welding power supply unit and control circuitry. The welding power supply unit includes an auxiliary power supply configured to supply power to an auxiliary power load connected to the auxiliary power supply. The control circuitry is configured to detect a voltage received by the auxiliary power load from the auxiliary power supply, compare an output voltage generated by the auxiliary power supply with the voltage received by the auxiliary power load, and apply a correction factor to the output voltage from the auxiliary power supply based at least in part on the comparison of the output voltage generated by the auxiliary power supply and the voltage received by the auxiliary power load.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
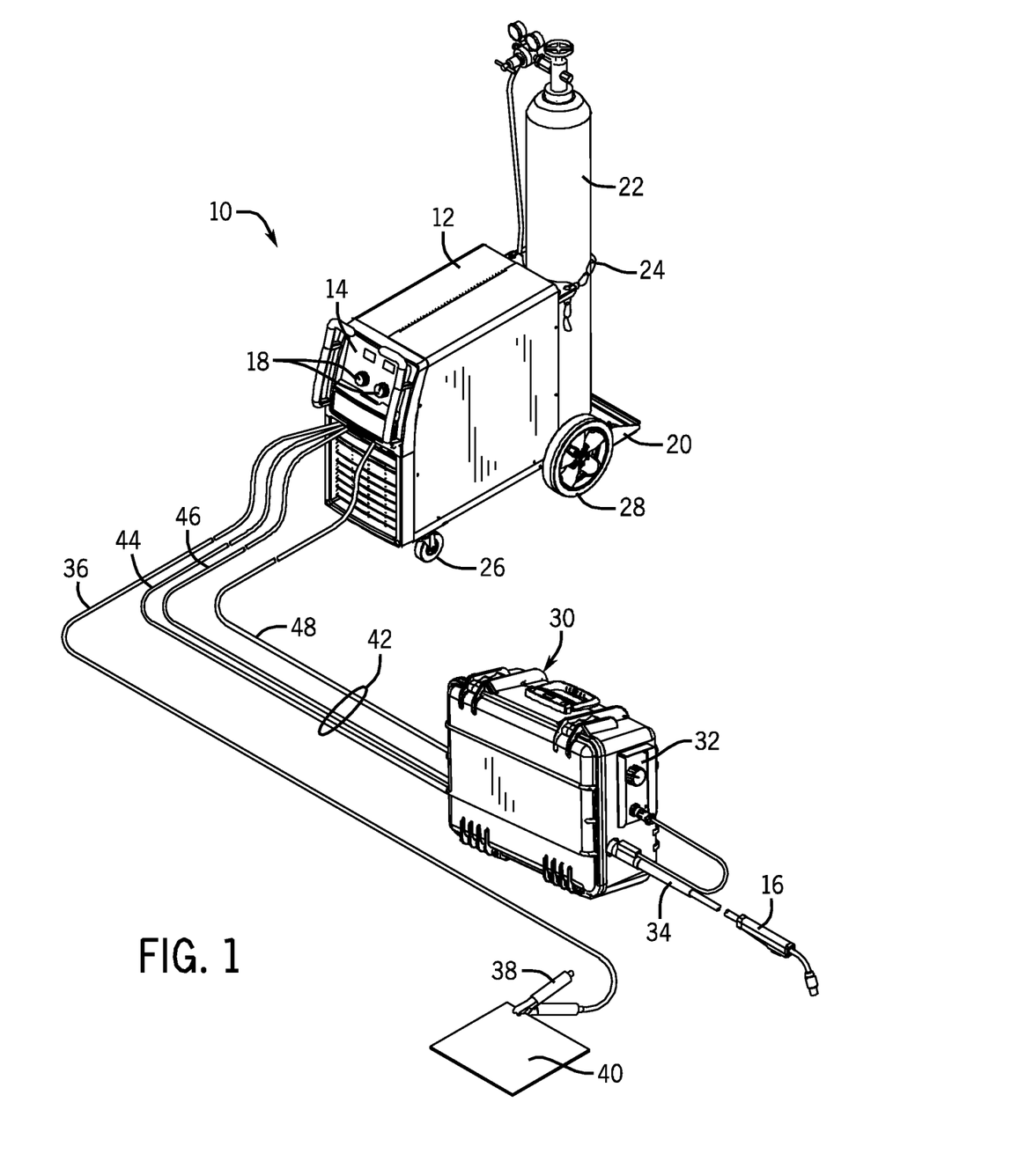
FIG. 1 is a perspective view of an embodiment of a welding system that includes a welding power supply with controlled auxiliary power.

Turning now to the figures, FIG. 1 illustrates an embodiment of a welding system 10 which powers, controls, and provides supplies to a welding operation. The welding system 10 includes a welding power supply 12 having an input device (e.g., a control panel 14) through which a welding operator may control the supply of welding materials, such as gas flow, wire feed, and so forth, to a welding gun 16. To that end, the control panel 14 includes input or interface devices, such as knobs 18 that the operator may use to adjust welding parameters (e.g., voltage, current, etc.). The welding power supply 12 may also include a tray 20 mounted on a back of the welding power supply 12 and configured to support a gas cylinder 22 held in place with a chain 24. The gas cylinder 22 is the source of the gas that supplies the welding gun 16. Furthermore, the welding power supply 12 may be portable via a set of smaller front wheels 26 and a set of larger back wheels 28, which enable the operator to move the welding power supply 12 to the location of the weld.

In certain embodiments, the welding system 10 may include auxiliary power loads such as wire feeders, pendants, water coolers, automatic controls (e.g., remote controls), and/or robot interfaces. As such, the welding power supply 12 may be configured to provide power (e.g., auxiliary power) to these auxiliary power loads. In addition, other equipment may be powered from an auxiliary power output on the welding power supply 12, such as grinders, lights, or other devices that may be used in a welding operation but are not included within the welding system 10. Further, the welding power supply 12 may include circuitry and other elements to control the auxiliary power and display status information about the auxiliary power.

As illustrated, the welding system 10 includes an auxiliary power load (e.g., a wire feeder 30). The wire feeder 30 provides welding wire to the welding gun 16 for use in the welding operation. The wire feeder 30 may include a control panel 32 that allows the user to set one or more wire feed parameters, such as wire feed speed. Additionally, the wire feeder 30 may house a variety of internal components, such as a wire spool, a wire feed drive system, a motor, and so forth. Additionally, the wire feeder 30 may be used with any wire feeding process, such as gas operations (gas metal arc welding (GMAW)) or gasless operations (flux cored arc welding (FCAW)). For example, the wire feeder 30 may be used in metal inert gas (MIG) welding.

A variety of cables couples the components of the welding system 10 together and facilitates the supply of welding materials to the welding gun 16. A first cable 34 (e.g., interconnection cable) couples the welding gun 16 to the wire feeder 30. A second cable 36 couples the welding power supply 12 to a work clamp 38 that connects to a workpiece 40 to complete the circuit between the welding power supply 12 and the welding gun 16 during a welding operation. A bundle 42 of cables (e.g., interconnection cables) couples the welding power supply 12 to the wire feeder 30 and provides weld materials for use in the welding operation. It should be noted that the bundle 42 of cables may not be bundled together in some embodiments. The bundle 42 includes a welding power lead 44, a gas hose 46, and a control cable 48.

As discussed previously, the bundle 42 may also provide auxiliary power to various auxiliary power loads of the welding system 10. A portion of the auxiliary power may be dissipated as it travels through the bundle 42 due to an internal resistance of the bundle 42. For example, the welding power supply 12 may provide a power output of approximately 42 V, but the power input received by the wire feeder 30 may be 30-35 V (i.e., the voltage dissipated by the bundle 42 may be approximately 7-12 V). Thus, the auxiliary power supplied by the welding power supply 12 may be less than the power output received by an auxiliary power load. Certain embodiments of the welding power supply 12 may include control and feedback circuitry to increase and/or stabilize the power input received by auxiliary loads, as further described in FIG. 2.

Figure 2:
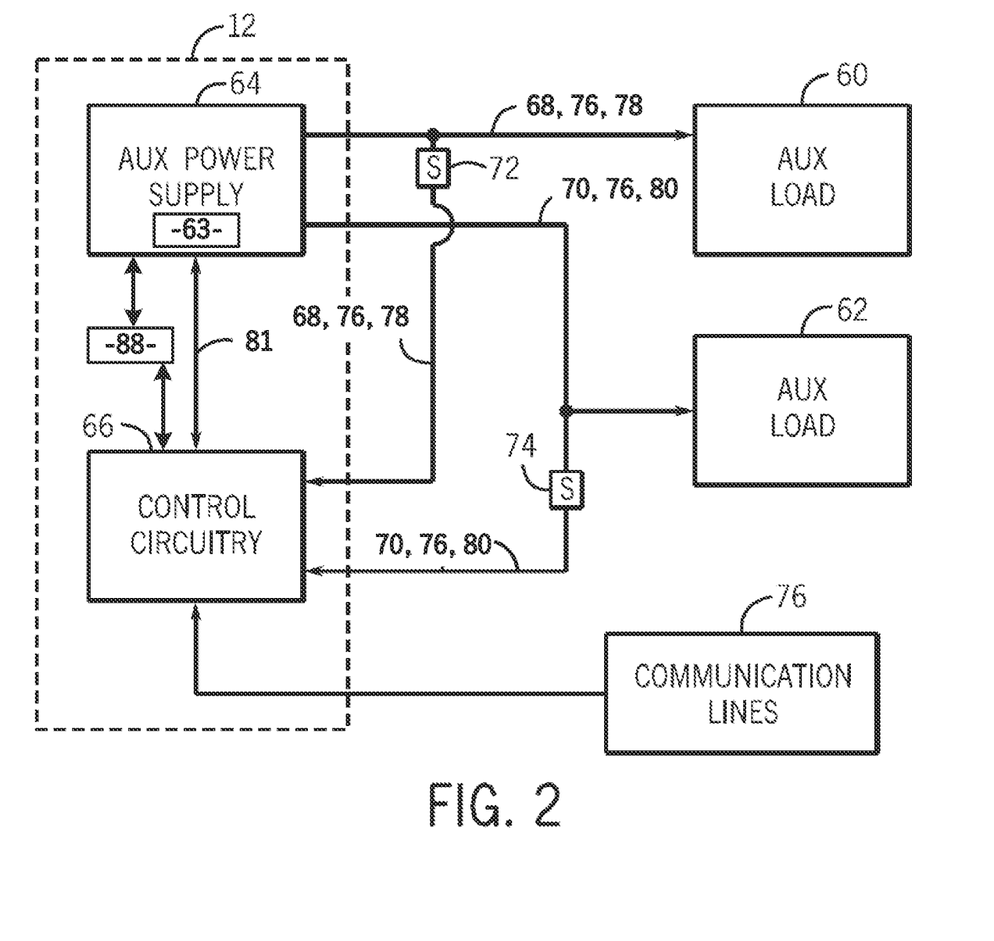
FIG. 2 is a schematic diagram of an embodiment of a portion of a welding system that includes a welding power supply with elements to control auxiliary power.

FIG. 2 is a schematic diagram of an embodiment of a portion of the welding system 10. The welding power supply 12 is configured to control auxiliary power and adjust the power received by auxiliary loads 60, 62. As illustrated, the welding power supply 12 includes an auxiliary power supply 64 and control circuitry 66. In certain embodiments, the control circuitry 66 may be at least partially external to the welding power supply 12 (e.g., at least partially contained within the auxiliary loads 60, 62, or some other components of the welding system 10). Additionally, the welding power supply 12 may include one or more auxiliary power supplies 64 with varying voltage and/or current ratings to feed one or more auxiliary loads 60, 62. During the welding operation, the load drawn by the auxiliary loads may vary, and it may be beneficial to adjust an output power generated by the auxiliary power supply 64. As shown, control circuitry 66 adjusts the power received by the auxiliary loads 60, 62 to improve the efficiency of the welding operation. In other embodiments, the welding system 10 may include 1, 2, 3, 4, 5, or more auxiliary loads, and the control circuitry 66 may adjust the power input to each of those loads. Further, each auxiliary load 60, 62 may have independent control circuitry 66 to adjust the power received by each auxiliary load 60, 62. As illustrated, the single auxiliary power supply 64 supplies power to both of the auxiliary loads 60, 62.

The auxiliary power supply 64 generates an output power that may be controlled or regulated. In certain embodiments, the auxiliary power supply 64 may include various circuits, such as buck, boost, full bridge, half bridge, forward, flyback, controlled rectifier, linear regulator, or a combination thereof, to regulate or condition the output power. Thus, the power supply 64 may use any circuit topology that is suitable to provide a controlled or regulated output power. Further, the auxiliary power supply 64 may provide multiple auxiliary power outputs (e.g., 24 VDC and 115 VAC). As illustrated, the auxiliary power supply 64 is connected to the auxiliary loads 60, 62 via interconnection cables 68, 70.

Specifically, the interconnection cable 68 connects the auxiliary power supply 64 to the auxiliary load 60, and the interconnection cable 70 connects the auxiliary power supply 64 to the auxiliary load 62. In other embodiments, the auxiliary loads 60, 62 may be connected to the auxiliary power supply 64 with a single interconnection cable.

The interconnection cables 68, 70 generally transfer power from the auxiliary power supply 64 to the auxiliary loads 60, 62. In certain embodiments, the lengths of the interconnection cables 68, 70 may vary depending on the configuration of the welding system 10. For example, the interconnection cable 68 may be approximately 300 ft long, and the interconnection cable 70 may be approximately 3 feet long. As discussed previously, a portion of the auxiliary power may be dissipated as it travels through the interconnection cables 68, 70 due to internal resistances, especially for longer interconnection cables 68, 70. Thus, the power received by the auxiliary loads 60, 62 may be less than the output power generated by the auxiliary power supply 64. Accordingly, the welding system 10 may include control circuitry 66, sensors 72, 74, and communication lines 76 to adjust and/or stabilize the auxiliary power to offset the dissipated power and to improve efficiency of the welding operation.

The sensors 72, 74 are communicatively coupled to control circuitry 66 via feedback lines 78, 80. In certain embodiments, the sensors 72, 74 may be coupled to, or included in, the communication lines 76. The sensors 72, 74 are configured to detect and/or measure a parameter (e.g., voltage) of the auxiliary power received by the auxiliary loads 60, 62, respectively. Additionally, the sensors 72, 74 may also be configured to detect and/or measure a parameter (e.g., voltage) of the output power generated by the auxiliary power supply 64. The sensors 72, 74 may measure one or more parameters simultaneously, such as voltage, current, power, temperature, resistance, or a combination thereof. Further, the sensors 72, 74 may detect and/or measure the one or more parameters continuously or discretely. For example, the sensors 72, 74 may measure the voltage and the current received by the auxiliary loads 60, 62 with a frequency of approximately 0.1, 10, 60, or 120 Hz, or another suitable rate set by an operator or software instructions. Further, the sensors 72, 74 may detect and/or measure the one or more parameters at predetermined time intervals (e.g., once every five minutes, once every minute, once every fifteen seconds, once every five seconds, once every second, once every millisecond, and so forth). Furthermore, in certain embodiments, the sensors 72, 74 may be configured to operate upon startup of the welding power supply 12, upon connection of the interconnection cables 68, 70 to the auxiliary power supply 64, upon activation of an input device (e.g., button, switch, slider, touch screen, and so forth) on the control panel 14, or at another suitable time determined by an operator or by software instructions.

The communication lines 76 are communicatively coupled to the control circuitry 66 and may communicate a variety of feedback information to the control circuitry 66. For example, the communication lines 76 may provide status information of the auxiliary loads 60, 62, resistance information of the interconnection cables 68, 70, or other feedback information that may be used to modify the operation of the auxiliary power supply 64 to improve efficiency of the welding operation. In certain embodiments, the source of the feedback information may be the auxiliary loads 60, 62 or another device external to the loads 60, 62 (e.g., a sensor or controller). For example, the communication lines 76 may include thermal sensors to provide thermal protection and fan control, sequencing signals to coordinate the power up sequencing of the auxiliary power supply 64 as a part of the welding power supply 12, and/or alarm setpoints to communicate undesirable conditions to the control panel 14. In addition, the communication lines 76 may include one or more analog or digital communication lines. In certain embodiments, the communication lines 76 may include power line communications, wireless communications, analog signal pairs, digital communications, and/or the like.

In some embodiments, the communication lines 76 may include the sensors 72, 74 and the feedback lines 78, 80 to communicate parameter information to the control circuitry 66. Further, in certain embodiments, the interconnection cables 68, 70 may include the communication lines 76. Additionally, the communication lines 76 may provide bi-direction communication between the auxiliary loads 60, 62 and the auxiliary power supply 64. For example, the auxiliary loads 60, 62 may communicate a maximum load to the power supply 64, or the auxiliary power supply 64 may communicate an auxiliary power status to the auxiliary loads 60, 62. The welding power supply 12 or other components within the welding system 10 may receive and utilize this information (e.g., auxiliary power status) for various functions, such as detecting an overload or fault condition. In general, the communication lines 76 may improve the coordination between the auxiliary power supply 64 and the auxiliary loads 60, 62.

The control circuitry 66 is configured to receive information from the sensors 72, 74 and the communication lines 76 to adjust and/or stabilize the auxiliary power to improve efficiency of the welding operation. For example, the control circuitry 66 may adjust the output power of the auxiliary power supply 64 in response to the voltage information from the sensors 72, 74. As discussed previously, the power received by the auxiliary loads 60, 62 may be less than the output power generated by the auxiliary power supply 64. Additionally, the load drawn by the auxiliary loads 60, 62 may vary over the course of the welding operation. Thus, the control circuitry 66 may apply a correction factor to the output power to adjust and/or stabilize the power received by the auxiliary loads 60, 62. For example, the welding power supply 12 may provide a power output of approximately 42 V, but the power input received by the auxiliary devices 60, 62 may be 30-35 V (i.e., the voltage dissipated by the interconnection cables 60, 62 may be approximately 7-12 V). In such a scenario, the control circuitry 66 may apply a correction factor to increase the power output of the welding power supply 12 to approximately 50 V, so that the power input received by the auxiliary devices 60, 62 is approximately 42 V. The adjusted and stabilized power input received by the auxiliary devices 60, 62 may improve efficiency of the welding operation.

The control circuitry 66 may also limit a parameter of the power received by the auxiliary loads 60, 62 or the output power generated by the auxiliary power supply 64. Thus, the output power may be bounded such that the output parameters (e.g., voltage or current) are limited to a predetermined maximum value. The communication lines 76 may report a fault or overload condition to the welding power supply 12 or control panel 14 when the voltage received by the auxiliary loads 60, 62 is greater than the maximum voltage. Additionally or alternatively, the control circuit 66 may disable the auxiliary power supply 64 when the power demand by the auxiliary loads 60, 62 exceeds a predetermined level. As may be appreciated, the instrumentation and shutdown logic may vary among different embodiments of the welding system 10.

As discussed previously, the welding system 10 may include elements to adjust and/or stabilize power input received by the auxiliary devices 60, 62 and improve efficiency of the welding operation. To this end, the auxiliary power supply 64 may include circuitry 63 to detect and/or measure an output voltage V1 generated by the auxiliary power supply 64. The auxiliary power supply 64 may communicate the output voltage V1 to the control circuitry 66 via a bi-directional communication line 81. Additionally, the sensors 72, 74 may measure a voltage V2 and/or current I1 received by the auxiliary loads 60, 62. The sensors 72, 74 may communicate this parameter information to the control circuitry 66 via the feedback lines 78, 80 or the communication lines 76. With this information, the control circuitry 66 may calculate a correction factor that may be used to adjust the voltage V2 in a manner proportional to the current I1. For example, the control circuitry 66 may calculate a resistance R1 of the interconnection cables 68, 70 based at least partially on the voltages V1, V2 and the current I1. The output voltage V1 may be adjusted by some factor of the resistance R1 of the interconnection cables 68, 70. In other embodiments, the resistance R1 may be estimated using various parameters that may be input by an operator at the input device (e.g., control panel 14). These parameters may include the lengths of the interconnection cables 68, 70, the types of the interconnection cables 68, 70 (e.g., identified by part number, etc.), a type of welding process (e.g., MIG or TIG) performed by the welding system 10, or a combination thereof.

Further, the resistance R1 may be used by the control circuitry 66 to adjust the output voltage V1 using an analog or digital adjustment. For example, the adjustment may be performed by a feedback control loop including the communications lines 76 using software instructions; however, in other embodiments, the output voltage V1 may be controlled using a feedback control loop that consists entirely of hardware (e.g., that operates without input from software). Further, the resistance R1 and/or adjustment of the output voltage V1 may occur at predetermined time intervals before, during, or after the welding operation. For example, the control circuitry 66 may be configured to operate upon startup of the welding power supply 12, upon connection of the interconnection cables 68, 70 to the auxiliary power supply 64, upon activation of an input device (e.g., button, switch, slider, touch screen, and so forth) on the control panel 14, or at another suitable time determined by an operator or by software instructions. Thus, the control circuitry 66 may reduce the likelihood or magnitude of inrush current overload current, or other undesirable conditions. Accordingly, the control circuitry 66 may determine parameters (e.g., a resistance or voltage drop) related to the interconnection cables 68, 70 and adjust an output parameter (e.g., output voltage V1) of the output power generated by the auxiliary power supply 64 to improve the efficiency of the welding operation, as is further illustrated in FIG. 3.

Figure 3:
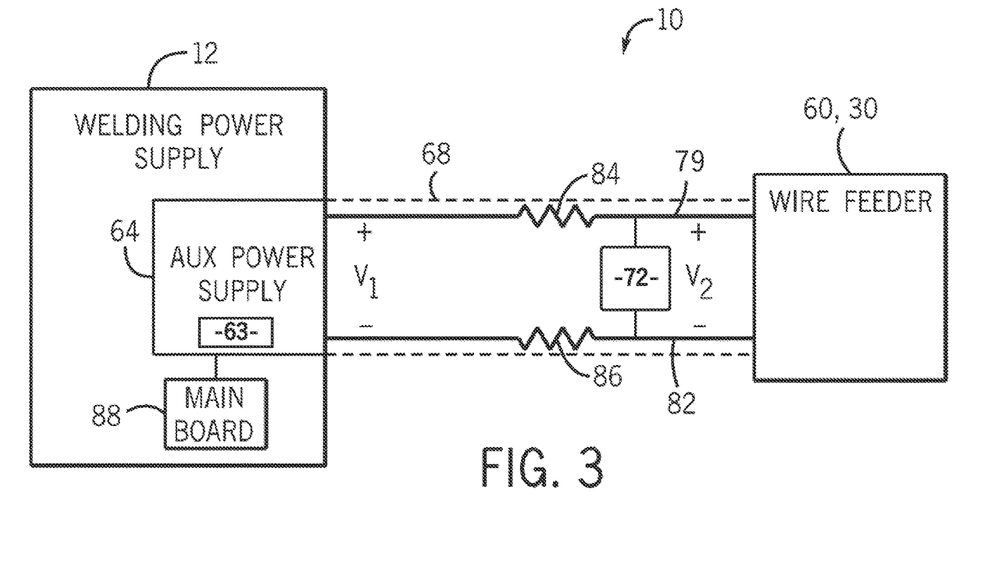
FIG. 3 is a schematic diagram of an embodiment of a welding system illustrating an interconnection between an auxiliary power supply and an auxiliary power load.

FIG. 3 is a schematic diagram of an embodiment of the welding system 10 illustrating the interconnection cable 68 between the auxiliary power supply 64 and the auxiliary power load 60 (e.g., the wire feeder 30). The interconnection cable 68 connects the auxiliary power supply 64 of the welding power supply 12 to the auxiliary power load 60. Additionally, the interconnection cable 68 includes an auxiliary power line 79 and an auxiliary power return line 82. The auxiliary power line 79 and the auxiliary return line 82 may form a complete circuit between the auxiliary power supply 64 and the auxiliary power load 60, enabling energy to flow between the two. The auxiliary power line 79 has an internal resistance 84, and the auxiliary return line 82 has an internal resistance 86. The combination of the internal resistances 84, 86 may approximately equal the resistance R1 of the interconnection cable 68.

As illustrated, the auxiliary power supply 64 generates power at the output voltage V1, and the auxiliary power load 60 receives power at the received voltage V2. The received voltage V2 may be less than the output voltage V1 due to the resistance R1 of the interconnection cable 68. Further, the received voltage V2 may be less than a desired voltage of the auxiliary power load 60 due to a change in the parameters of the welding operation. In certain embodiments, the auxiliary power supply 64 may include the control circuitry 66 to adjust the output voltage V1 to adjust the received voltage V2 and improve the efficiency of the welding operation. To this end, as described below in FIG. 4, the welding power supply 12 may include a main board 88 configured to communicate software instructions to the auxiliary power supply 64 and/or the control circuitry 66.

Figure 4:
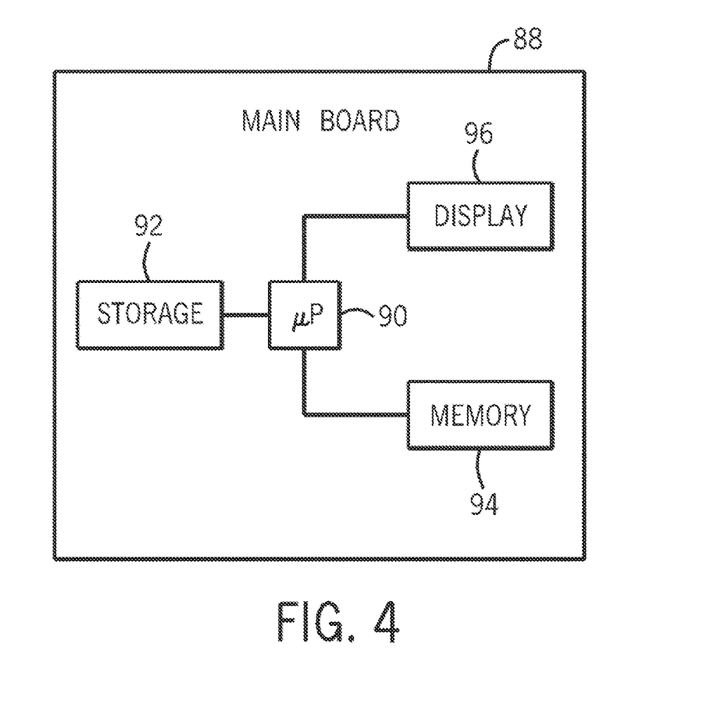
FIG. 4 is a schematic diagram of an embodiment of a control system including elements to control auxiliary power.

FIG. 4 illustrates the main board 88 configured to improve the efficiency of the welding operation by using software instructions communicated to the auxiliary power supply 64. The main board 88 includes a processor 90 and/or other data processing circuitry to execute the software instructions. These instructions may be encoded in programs that may be executed by the processor 90. Further, these instructions may be stored in any suitable article of manufacture that includes at least one tangible non-transitory, computer-readable medium that collectively stores these instructions or routines, such as storage 92 or memory 94. The storage 92 and the memory 94 may include, for example, random-access memory, read-only memory, rewritable memory, hard drive(s), and/or optical discs. In some embodiments, the main board 88 may include a display 96 for displaying, for example, a graphical user interface and/or data related to the welding system 10.

The display 96 may include a user interface for an operator to input information about the welding system 10. For example, an operator may input into the display 96 a length of the interconnection cable 68, 70, a type of the interconnection cable 68, 70 (e.g., identified by part number, etc.), a type of a welding process performed, or a combination thereof. The control circuitry 66 may use this information to adjust the output power generated by the auxiliary power supply 64 to improve efficiency of the welding operation. Further, in certain embodiments, the operator may input alarm setpoints that may be used by the control circuitry 66 to limit various parameters of the welding operation. For example, the operator may limit the output power generated by the auxiliary power supply 64 to a predetermined maximum or minimum value. The display 96 may communicate general status information and may report a fault or overload condition to an operator.

Figure 5:
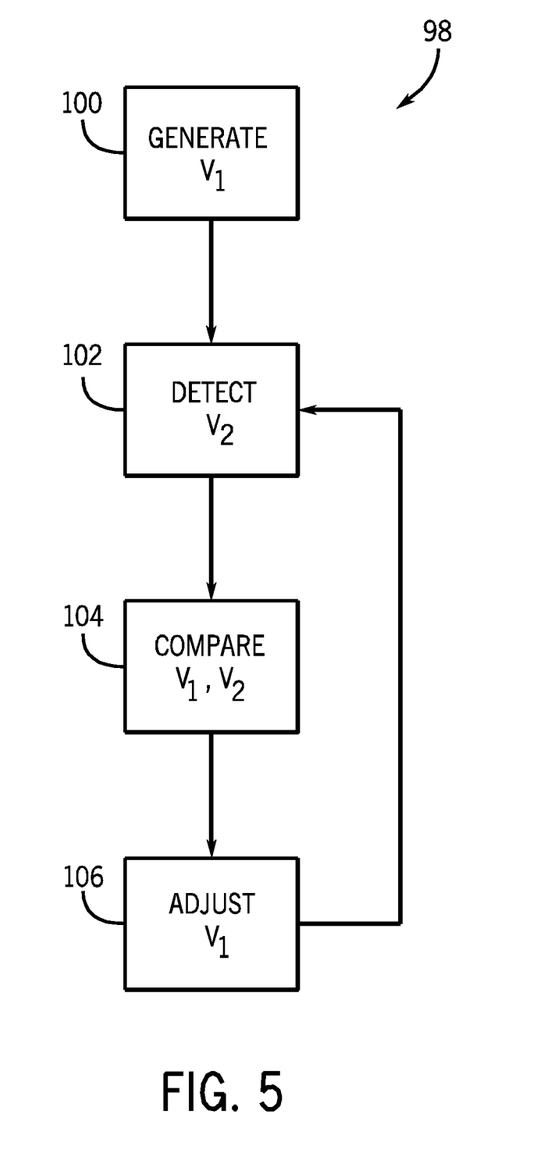
FIG. 5 is a flow chart of an embodiment of a method to control auxiliary power in accordance with aspects of the present techniques.

FIG. 5 illustrates a flow chart of an embodiment of a method 98 to control auxiliary power of the welding system 10. The auxiliary power supply 64 may generate (block 100) output power having an output parameter (e.g., voltage, current, power). The output power may travel along the interconnection cables 68, 70 to the auxiliary loads 60, 62. The auxiliary loads 60, 62 may then detect (block 102) received power having a received parameter (e.g., voltage, current power). The detected (block 102) parameter may be communicated to the auxiliary power supply 64 and/or the control circuitry 66 via the communication lines 76 and/or the feedback lines 78, 80. As discussed previously, the detected (block 102) parameter may be inadequate for efficient operation of the auxiliary loads 60, 62. The auxiliary power supply 64 and/or the control circuitry 66 may compare (block 104) the output parameter and the received parameter. In certain embodiments, comparing (block 104) the parameters may include calculating or estimating the resistance R1 of the interconnection cables 68, 70. The auxiliary power supply 64 and/or control circuitry may adjust (block 106) the output power to improve efficiency of the welding operation. In some embodiments, the output power may be adjusted (block 106) by some factor of the resistance R1. The welding system 10 may continue to detect (block 102) the received parameter to further improve the efficiency of the welding operation.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A welding system, comprising:
 a plurality of auxiliary power loads;
 a plurality of interconnection cables;
 a welding power supply unit for controlling the plurality of auxiliary power loads and adjusting power received by the plurality of auxiliary power loads, wherein the welding power supply unit comprises:
  an auxiliary power supply for generating controlled and regulated auxiliary output power configured to supply power to the plurality of auxiliary power loads, wherein the auxiliary power supply comprises a detection circuitry to measure at least a voltage from the auxiliary output power;
  a control circuitry for independent adjustment or stabilization of the power received at the plurality of auxiliary power loads;
  a bidirectional communication line coupled between the auxiliary power supply and the control circuitry to communicate at least the voltage measured by the detection circuitry to the control circuitry,
 wherein the plurality of interconnection cables connects the auxiliary power supply to the plurality of auxiliary power loads, the plurality of interconnection cables comprising:
  an integrated feedback communication line,
  an output communication line, and
  an integrated detection sensor for detecting or measuring an electrical parameter of the auxiliary output power received by one or more of the plurality of auxiliary power loads, the integrated detection sensor coupled between the one or more of the plurality of auxiliary power loads and the auxiliary power supply via the output or feedback communication lines, and
 wherein the control circuitry includes a main board comprising a processor connected to an operator interface including an input device and a memory for executing software instructions for routines, the processor communicating software instructions to the control circuitry configured to:
  compare the electrical parameter delivered from the auxiliary power supply based on a measurement of the electrical parameter from the detection circuitry to a parameter received by the one or more of the plurality of auxiliary power loads based on a measurement from the integrated detection sensor;
determine parameters relating to the interconnect cable based on the comparison; and
automatically adjust or stabilize the auxiliary output power delivered to one or more of the plurality of auxiliary power loads from the auxiliary power supply based on the comparison between the measurements of the detection circuitry and the integrated detection sensor to offset dissipated power or improve efficiency of a welding operation.

2. The system of claim 1, wherein the control circuitry is configured to apply a correction factor to an output voltage supplied from the auxiliary power supply to the auxiliary power load based at least in part on the determined parameters relating to the interconnection cable.

3. The system of claim 1, wherein the control circuitry is configured to operate in a mode wherein the control circuitry determines the parameters relating to the interconnection cable at predetermined time intervals.

4. The system of claim 1, wherein the control circuitry is configured to operate in a mode wherein the control circuitry determines the parameters relating to the interconnection cable upon startup of the welding power supply unit, upon connection of the interconnection cable to the auxiliary power supply, upon activation of an input device on an operator interface of the welding power supply unit, or a combination thereof.

5. The system of claim 1, wherein the control circuitry is configured to determine the parameters relating to the interconnection cable based at least in part on information input by an operator.

6. The system of claim 5, wherein the information comprises a length of the interconnection cable, a type of the interconnection cable, a type of a welding process, or a combination thereof, input by the operator.

7. The system of claim 1, wherein the control circuitry comprises software instructions for controlling an output voltage of the auxiliary power supply based on the determined parameters relating to the interconnection cable.

8. The system of claim 1, wherein the control circuitry comprises circuitry for performing analog or digital adjustment of an output voltage of the auxiliary power supply based on the determined parameters relating to the interconnection cable.

9. The system of claim 1, wherein the auxiliary power load comprises at least one of: a welding wire feeder, a welding remote control, or a user interface device.

10. A welding system, comprising:
a plurality of auxiliary power loads;
a plurality of interconnection cables;
a welding power supply unit for controlling the plurality of auxiliary power loads and adjusting power received by the plurality of auxiliary power loads, wherein the welding power supply unit comprises:
an auxiliary power supply for generating controlled and regulated auxiliary output power configured to supply power to the plurality of auxiliary power loads, wherein the auxiliary power supply comprises a detection circuitry to measure at least a voltage from the auxiliary output power;
a control circuitry for independent adjustment or stabilization of the power received at the plurality of auxiliary power loads;
a bidirectional communication line coupled between the auxiliary power supply and the control circuitry to communicate at least the voltage measured by the detection circuitry to the control circuitry,
wherein the plurality of interconnection cables connects the auxiliary power supply to the plurality of auxiliary power loads, the plurality of interconnection cables comprising:
an integrated feedback communication line,
an output communication line, and
an integrated detection sensor for detecting or measuring an electrical parameter of the auxiliary output power received by one or more of the plurality of auxiliary power loads, the integrated detection sensor coupled between the one or more of the plurality of auxiliary power loads and the auxiliary power supply via the output or feedback communication lines, and
wherein the control circuitry includes a main board comprising a processor connected to an operator interface including an input device and a memory for executing software instructions for routines, the processor communicating software instructions to the control circuitry configured to:
detect the voltage from the auxiliary output power delivered from the auxiliary power supply based on the measurement of the voltage from the detection circuitry;
detect a received voltage by the one or more of the plurality of auxiliary power loads from the auxiliary power supply based on a measurement of the received voltage from the integrated detection sensor;
compare the voltage from the auxiliary output power delivered from the auxiliary power supply based on the measurement of the voltage from the detection circuitry to the received voltage by the one or more of the plurality of auxiliary power loads based on the integrated detection sensor; and
automatically apply a correction factor to an output voltage from the auxiliary power supply based on the comparison between the voltages measured by the detection circuitry and the integrated detection sensor to offset dissipated power or improve efficiency of a welding operation.

11. The system of claim 10, wherein the correction factor to the output voltage from the auxiliary power supply is based at least in part on a calculation of a resistance in the interconnection cable between the detection circuitry and the integrated detection sensor.

12. The system of claim 10, wherein the control circuitry is configured to identify an overload of the auxiliary power supply based on measurements from the detection circuitry and the integrated detection sensor.

13. The system of claim 12, wherein the control circuitry is configured to disable the auxiliary power supply based on the identified overload.

14. A welding system, comprising:
a first auxiliary power load;
a second auxiliary power load;
a first interconnection cable;
a second interconnection cable; and
a welding power supply unit for controlling the first and second auxiliary power loads and adjusting power received by the first and second auxiliary power loads, wherein the welding power supply unit comprises:
a control circuitry for independent adjustment or stabilization of the power received at the first and second auxiliary power loads;

a bidirectional communication line coupled between the auxiliary power supply and the control circuitry to communicate at least the voltage measured by the detection circuitry to the control circuitry, wherein the first interconnection cable connects the auxiliary power supply to the first auxiliary power load, the first interconnection cable comprising:
  a first integrated feedback communication line,
  a first output communication line, and
  a first integrated detection sensor for detecting or measuring a first electrical parameter of the auxiliary output power received by the first auxiliary power load, the first integrated detection sensor coupled between the first auxiliary power load and the auxiliary power supply via the first output communication line or the first feedback communication line, and wherein the second interconnection cable connects the auxiliary power supply to the second auxiliary power load, the second interconnection cable comprising:
  a second integrated feedback communication line,
  a second output communication line, and
  a second integrated detection sensor for detecting or measuring a second electrical parameter of the auxiliary output power received by the second auxiliary power load, the second integrated detection sensor coupled between the second auxiliary power load and the auxiliary power supply via the second output communication line or the second feedback communication line, and wherein the control circuitry includes a main board comprising a processor connected to an operator interface including an input device and a memory for executing software instructions for routines, the processor communicating software instructions to the control circuitry configured to:

compare first and second voltages from the auxiliary output power delivered from the auxiliary power supply based on a measurement from the detection circuitry to third and fourth voltages received by the first and second auxiliary power loads based on a measurement from the first and second integrated detection sensors, respectively,
  determine parameters relating to the first and second interconnection cables based on the comparison; and
  automatically adjust the first and second voltages from the auxiliary output power delivered from the auxiliary power supply to both the first auxiliary power load and the second auxiliary power load based on the auxiliary output power from the auxiliary power supply measured by the detection circuitry to the first and second auxiliary power loads that are measured by the first and second integrated detection sensors to offset dissipated power or improve efficiency of a welding operation.

15. The system of claim 14, wherein the control circuitry is configured to apply a correction factor to an output voltage supplied from the auxiliary power supply to the first and the second auxiliary power loads based on the determined parameters.

16. The system of claim 15, wherein the control circuitry is configured to calculate an increased output voltage supplied from the auxiliary power supply to the first and the second auxiliary power loads based on the correction factor.

17. The system of claim 16, wherein the control circuitry is configured to compare the calculated increased output voltage to a predetermined threshold output voltage level of the auxiliary power supply.

18. The system of claim 17, wherein the control circuitry is configured to disable the auxiliary power supply when the increased output voltage exceeds the predetermined threshold output level.

* * * * *